Patented Dec. 8, 1925.

1,564,664

UNITED STATES PATENT OFFICE.

HENRY A. GARDNER, OF WASHINGTON, DISTRICT OF COLUMBIA.

FILM-FORMING COMPOSITION.

No Drawing. Application filed April 7, 1925. Serial No. 21,424.

*To all whom it may concern:*

Be it known that I, HENRY A. GARDNER, a citizen of the United States, residing at Washington, in the District of Columbia, have invented certain new and useful Improvements in Film-Forming Composition, of which the following is a specification.

This invention relates to compositions which may be used in the production of film coatings such as paints, varnishes, lacquers and the like, and in the production of films, filaments, celluloid-like and composite bodies and for other purposes, and to such articles produced therefrom.

The principal object of my invention is to produce film coatings which have a high and enduring gloss or luster, are pliable, flexible and tough and retain such properties; resist checking, cracking, peeling and marring, and adhere firmly to metal and other surfaces without the use of underlying coatings of varnish, oil primers and the like, forming continuous impervious coatings thereon.

My invention therefore resides more particularly in film-forming compositions and to the films produced therefrom.

The basis of the compositions of my invention is a group of resins formed by the condensation of toluene sulfoamids, such as paratoluene sulfoamid, with aldehydes, such as formaldehyde or paraformaldehyde, hereinafter referred to generically as toluene sulfoamid-aldehyde resins.

I have found that the toluene sulfoamid-aldehyde resins alone, when dissolved in suitable solvents such as benzol, are effective as film-forming materials. Solutions of the resins in suitable solvents when applied to surfaces and dried give effective protective coatings. The films produced by the resins alone, that is, simple solutions of the resins, are improved by the addition of other resins, such as ordinary rosin, and by the addition of drying oils or the fatty acids of drying oils, such as tung oil fatty acids or both. For example, a solution of 50 grams of the resin produced by the condensation of paratoluene sulfoamid with formaldehyde, 1 gram of rosin and 1 gram of tung oil or the fatty acids thereof in 50 grams of benzol is an effective film-forming composition and when applied to surfaces and dried gives film coatings having excellent protective properties.

I have further found that by combining the toluene sulfoamid-aldehyde resins with organo-oxy-cellulose compounds compositions having properties fitting them for a great variety of uses, particularly for the production of film coatings, are obtained. By organo-oxy-cellulose compounds I mean the cellulose esters and ethers such as, for instance, nitrocellulose and the cellulose acetates. For instance, by dissolving an organo-oxy-cellulose compound, such as nitrocellulose, in a suitable solvent therefor, such as butyl acetate, ethyl acetate, acetone, absolute alcohol or mixtures thereof with each other or with other solvents and adding to the solution a solution of a toluene-sulfo-amid-aldehyde resin (such as the resin obtainable by condensing paratoluene-sulfo-amid with formaldehyde) in benzol, toluol or other suitable solvent, there is obtained a clear or nearly clear solution which when pressed, sprayed or otherwise applied to surfaces produces thereon films of the character described. The clear solution referred to may be used directly as a varnish or lacquer or for the production of films, etc., or it may be combined with pigments, for instance, by mixing it with a pigment preferably ground in castor oil, to produce paints or enamels.

As a specific example, I have found the following materials and proportions to give a satisfactory film-forming composition: 24 ounces of nitrocellulose are dissolved in one gallon of a solvent such as butyl acetate, ethyl acetate, acetone, anhydrous alcohol or a mixture of such solvents, and to this solution is added two quarts of a solution prepared by dissolving 16 ounces of paratoluene sulfoamid-formaldehyde resin in 16 ounces of benzol or other solvent or mixture of solvents. The resulting solution which is clear and may be further thinned or diluted and to which pigments may be added, when spread into a film upon a surface and dried, gives a pliable, flexible and tough coating having a high and enduring gloss. The film, compared with films produced from nitrocellulose solutions with the commonly used plasticizers such as tri-cresyl phosphate, tri-phenyl phosphate, camphor, butyl tartrate, butyl phthalate, castor oil, etc., has a much greater elasticity or elongation. The film when applied to unprimed surfaces, such as clean metal, adheres very tenaciously. The resins appear to have the property, with respect to film-forming material in general, of increasing the plasticity, gloss and adherence of films obtained therefrom. This property has been observed, particularly with reference to nitrocellulose. A solution of nitrocellulose mixed with a solution of paratoluene sulfoamid-aldehyde resin dries to a clear elastic celluloid-like body which may be used as a substitute for celluloid, or the solution may be used for the production of films or filaments or thread-like bodies analogous to artificial silk by extrusion or for the production of film coatings by applying it to surfaces as is customary in the application of paints and varnishes.

The resin also apparently exerts a solvent action upon nitrocellulose, as is evidenced by the fact that a solution of the resin in benzol (benzol is not a solvent for nitrocellulose) exerts a solvent and gelatinizing action upon dry nitrocellulose, producing a tough plastic mass.

I am not aware of the action of the resin upon the organo-oxy-cellulose compounds, but it appears quite probable in view of the facts recited above that some chemical action takes place and, as has been stated, the resin acts as a solvent, plasticizer and gloss additive agent and greatly improves the adherence properties of films.

The paratoluene sulfoamid-formaldehyde resin referred to is a semi-solid to solid, clear, transparent mass, becoming soft and sticky upon the application of slight heat, is permanently fusible and is soluble in the usual organic solvents such as benzol.

In the appended claims compositions containing an organo-oxy-cellulose compound and a toluene-sulfoamid resin are to be understood to include such compounds and/or their reaction products.

I claim:—

1. A composition of matter comprising an organo-oxy-cellulose compound and a toluene sulfoamid-aldehyde resin.

2. As a film-forming composition a solution containing an organo-oxy-cellulose compound and a toluene sulfoamid-aldehyde resin.

3. A film comprising an organo-oxy-cellulose compound and a toluene sulfoamid-aldehyde resin.

4. A composition of matter comprising an organo-oxy-cellulose compound and a paratoluene sulfoamid-formaldehyde resin.

5. As a film-forming composition a solution containing an organo-oxy-cellulose compound and a paratoluene sulfoamid-formaldehyde resin.

6. A film comprising an organo-oxy-cellulose compound and a paratoluene sulfoamid-formaldehyde resin.

7. A composition of matter comprising a nitro-cellulose compound and a paratoluene sulfoamid-formaldehyde resin.

8. As a film-forming composition a solution containing a nitrocellulose compound and a paratoluene sulfoamid-formaldehyde resin.

9. A film comprising a nitrocellulose compound and a paratoluene sulfoamid-formaldehyde resin.

In testimony whereof, I affix my signature.

HENRY A. GARDNER.